(12) United States Patent
Merten et al.

(10) Patent No.: US 8,095,932 B2
(45) Date of Patent: Jan. 10, 2012

(54) PROVIDING QUALITY OF SERVICE VIA THREAD PRIORITY IN A HYPER-THREADED MICROPROCESSOR

(75) Inventors: Matthew Merten, Hillsboro, OR (US); Santhosh Srinath, Kirkland, WA (US); Morris Marden, Hillsboro, OR (US); John Holm, Beaverton, OR (US); Glenn Hinton, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1183 days.

(21) Appl. No.: 11/838,458

(22) Filed: Aug. 14, 2007

(65) Prior Publication Data

US 2009/0049446 A1 Feb. 19, 2009

(51) Int. Cl.
*G06F 9/46* (2006.01)

(52) U.S. Cl. ........................... 718/104; 718/103
(58) Field of Classification Search .................. 718/103, 718/104
See application file for complete search history.

(56) References Cited

U.S. PATENT DOCUMENTS

| | | | | |
|---|---|---|---|---|
| 5,724,565 A * | 3/1998 | Dubey et al. | | 712/245 |
| 5,826,082 A * | 10/1998 | Bishop et al. | | 718/104 |
| 6,567,839 B1 * | 5/2003 | Borkenhagen et al. | | 718/103 |
| 7,509,643 B2 * | 3/2009 | Qiu et al. | | 718/103 |
| 2003/0233394 A1 | 12/2003 | Rudd et al. | | |
| 2004/0194094 A1 | 9/2004 | Qiu et al. | | |
| 2005/0021931 A1 * | 1/2005 | Anderson et al. | | 712/220 |
| 2005/0125789 A1 * | 6/2005 | Dijkstra et al. | | 718/100 |
| 2006/0069874 A1 | 3/2006 | Desai | | |
| 2008/0040554 A1 | 2/2008 | Zhao et al. | | |
| 2008/0075101 A1 | 3/2008 | Illikkal et al. | | |
| 2008/0162868 A1 | 7/2008 | Glew | | |

OTHER PUBLICATIONS

United States Patent Application, pending, not yet published, U.S. Appl. No. 11/540,307, filed Sep. 29, 2006 to Merten et al.
United States Patent Application, pending, not yet published, U.S. Appl. No. 11/784,864, filed Apr. 9, 2007 to Marden et al.
United States Patent Application, pending, not yet published, U.S. Appl. No. 11/786,019, filed Apr. 9, 2007 to Illikkal et al.
Cazorla et al., "Predictable Performance in SMT Processors: Synergy between the OS and SMTs", IEEE Transactions on Computers, vol. 55, No. 7, Jul. 2006, pp. 785-799.
Cazorla et al., "QoS for High-Performance SMT Processors in Embedded Systems", IEEE Computer Society, 2004, pp. 24-31.
Office Action for Chinese Patent Application No. 200810213212.2 mailed on Jun. 9, 2010, 11 Pages of Office action including English Translation.

* cited by examiner

*Primary Examiner* — Diem Cao
(74) *Attorney, Agent, or Firm* — David P. McAbee

(57) ABSTRACT

A method and apparatus for providing quality of service in a multi-processing element environment based on priority is herein described. Consumption of resources, such as a reservation station and a pipeline, are biased towards a higher priority processing element. In a reservation station, mask elements are set to provide access for higher priority processing elements to more reservation entries. In a pipeline, bias logic provides a ratio of preference for selection of a high priority processing element for further processing in the pipeline.

18 Claims, 7 Drawing Sheets

PROVIDING QUALITY OF SERVICE VIA THREAD PRIORITY IN A HYPER-THREADED MICROPROCESSOR

FIELD

This invention relates to the field of processors and, in particular, to providing quality of service to priority processing elements.

BACKGROUND

Advances in semi-conductor processing and logic design have permitted an increase in the amount of logic that may be present on integrated circuit devices. As a result, computer system configurations have evolved from a single or multiple integrated circuits in a system to multiple cores and multiple logical processors present on individual integrated circuits. A processor or integrated circuit typically comprises a single processor die, where the processor die may include any number of processing elements, such as cores, threads, and/or logical processors.

In processors with multiple threads, the behavior of one thread potentially affects the behavior of another thread on the same processor core due to sharing of resources and pipelines. Often behavior of one thread creates unfairness in the usage of the shared resources and pipelines. In fact, when one thread's performance significantly changes in relation to other threads on the same core, often a large and unpredictable variability in performance from the unbalanced usage of shared resources occurs.

Threads are often executing software entities, which differ in their level of priority both from a system level and user-level perspectives. Often, highest priority software entities includes applications with deadlines, such as media applications. For example, if a first thread executing a media application is adversely affected by another thread executing a virus scan in the background, a user may experience skips or glitches, which detract from performance.

Previously, efforts have focused on maintaining fairness between threads. Yet, fair access to processing resources may not be enough to guarantee quality of service to the higher priority threads/software entities. Continuing the example above, fair access by the first and second threads to processing resources may not be enough to ensure the media application runs smoothly. As a result, higher priority threads/applications potentially require a larger unfair amount of resource to ensure efficient execution.

BRIEF DESCRIPTION OF THE DRAWINGS

The present invention is illustrated by way of example and not intended to be limited by the figures of the accompanying drawings.

DETAILED DESCRIPTION

In the following description, numerous specific details are set forth such as examples of specific bias logic embodiments to provide quality of service between processing elements, specific processor organization, specific pipeline stages, etc. in order to provide a thorough understanding of the present invention. It will be apparent, however, to one skilled in the art that these specific details need not be employed to practice the present invention. In other instances, well known components or methods, such as different varieties of pipelines, empty cycle detection, processing element identification, processing element selection, and specific operational details of microprocessors, have not been described in detail in order to avoid unnecessarily obscuring the present invention.

The method and apparatus described herein are for providing quality of service to processing elements based on priority. Specifically, providing quality of service is primarily discussed in reference to a microprocessor with multiple threads. However, the methods and apparatus for providing quality of service are not so limited, as they may be implemented on or in association with any integrated circuit device or system, such as cell phones, personal digital assistants, embedded controllers, mobile platforms, desktop platforms, and server platforms, as well as in conjunction with any type of processing element, such as a core, hardware thread, software thread, logical processor, or other processing element.

Figure 1:
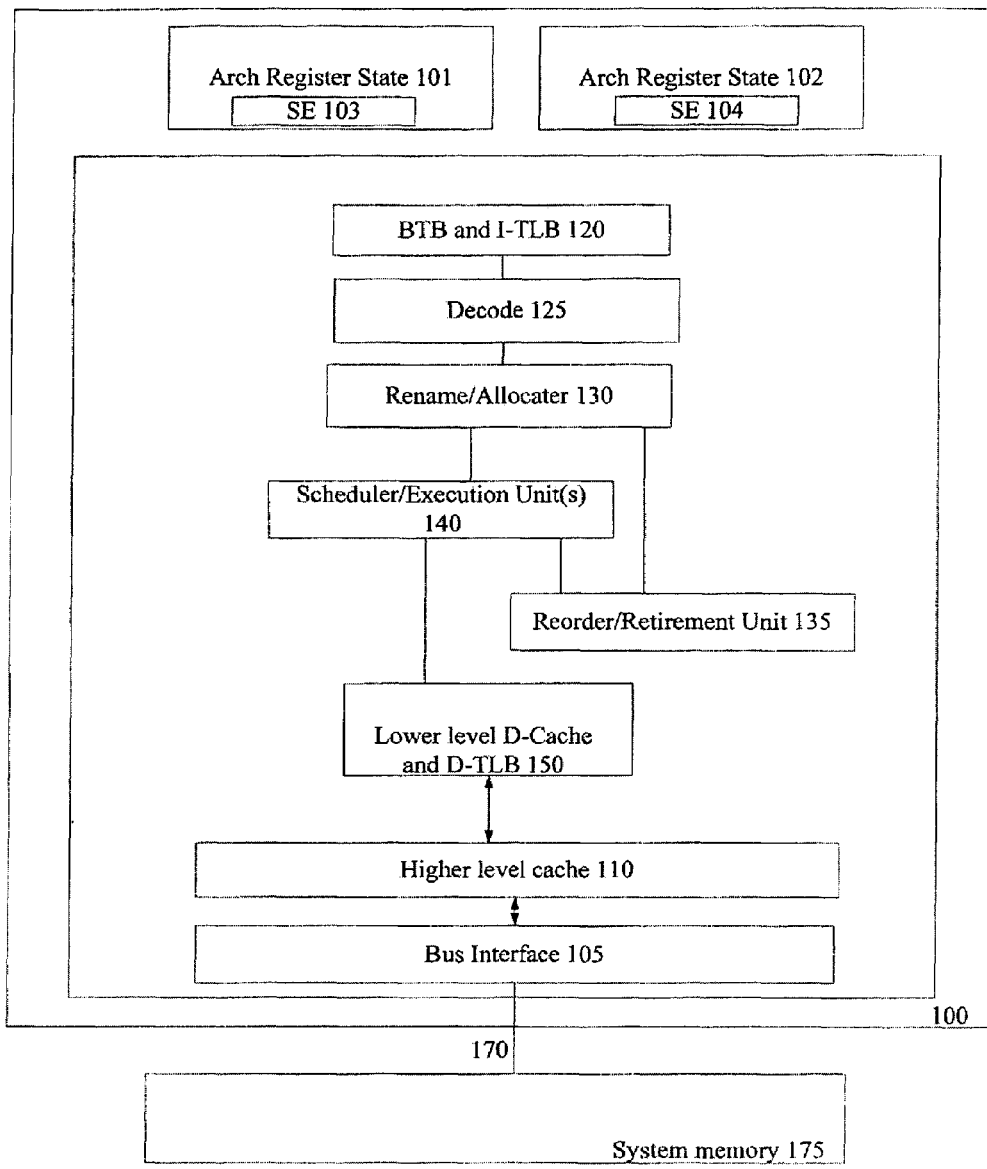

Referring to FIG. 1, an embodiment of a processor capable of providing quality of service to processing elements based on priority is illustrated. A processing element refers to a thread, a process, a context, a logical processor, a hardware thread, a core, and/or any processing element, which shares access to resources of the processor, such as reservation units, execution units, pipelines, and higher level caches/memory. For example, a processing element refers to a software thread to be executed on a hardware thread or core of a physical processor. As discussed below, the processing element, such as a software thread, may be associated with a priority level. A physical processor typically refers to an integrated circuit, which potentially includes any number of other processing elements, such as cores or hardware threads.

A core often refers to logic located on an integrated circuit capable of maintaining an independent architectural state, such as architectural states 101 and 102, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources.

As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor. In other words, software views two cores or threads on a physical processor as two independent processors. Additionally, each core potentially includes multiple hardware threads for executing multiple software threads. Therefore, a processing element includes any of the aforementioned elements capable of maintaining a context, such as cores, threads, hardware threads, virtual machines, or other resources, that share access to a shared resource of a processor, such as a shared pipeline or shared reservation unit/station.

In one embodiment, processor 100 is a multi-threaded processor capable of executing multiple threads in parallel. Here, a first thread is associated with architecture state registers 101 and a second thread is associated with thread 102. Therefore, below thread 101 and 102 refer to the first and second threads, respectively. Thread 101 and 102 share access to a reservation unit(s), which may be distributed in processor 100 or located in units, such as scheduler/execution module 140 or rename/allocater module 130. Storage elements 103 and 104 are each to hold a priority level associated with thread 101 and 102, respectively. As discussed below, in one embodiment, portions of the reservation unit(s) are capable of being dedicated to each thread, shared amongst both threads, or reserved, i.e. not associated with either thread, based on priority levels of threads 101 and 102.

In addition, a pipeline or portion of a pipeline, such as a front-end or instruction decode portion of the pipeline, is shared by threads 101 and 102. Here, the pipeline or the portion of the pipeline, in one embodiment, is capable of providing quality of service to threads 101 and 102 based on priority levels.

As illustrated, architecture state registers 101 are replicated in architecture state registers 102, so individual architecture states/contexts are capable of being stored for logical processor 101 and logical processor 102. Other smaller resources, such as instruction pointers and renaming logic in rename allocater logic 130 may also be replicated for threads 101 and 102. Some resources, such as re-order buffers in reorder/retirement unit 135, ILTB 120, load/store buffers, and queues may be shared through partitioning. While resources, such as general purpose internal registers, page-table base register, low-level data-cache and data-TLB 150, execution unit(s) 140, and out-of-order unit 135 are potentially fully shared. Note, as discussed later, storage elements 103 and 104, may be included within a single physical storage area, as well as located outside a hardware threads physical structure.

Bus interface module 105 is to communicate with devices external to processor 100, such as system memory 175, a chipset, a northbridge, or other integrated circuit. Memory 175 may be dedicated to processor 100 or shared with other devices in a system. Examples of memory 175 includes dynamic random access memory (DRAM), static RAM (SRAM), non-volatile memory (NV memory), and long-term storage.

Typically bus interface unit 105 includes input/output (I/O) buffers to transmit and receive bus signals on interconnect 170. Examples of interconnect 170 include a Gunning Transceiver Logic (GTL) bus, a GTL+ bus, a double data rate (DDR) bus, a pumped bus, a differential bus, a cache coherent bus, a point-to-point bus, a multi-drop bus or other known interconnect implementing any known bus protocol. Bus interface unit 105 as shown is also to communicate with higher level cache 110.

Higher-level or further-out cache 110 is to cache recently fetched and/or operated on elements. Note that higher-level or further-out refers to cache levels increasing or getting further way from the execution unit(s). In one embodiment, higher-level cache 110 is a second-level data cache. However, higher level cache 110 is not so limited, as it may be or include an instruction cache, which may also be referred to as a trace cache. A trace cache may instead be coupled after decoder 125 to store recently decode instructions. Module 120 also potentially includes a branch target buffer to predict branches to be executed/taken and an instruction-translation buffer (I-TLB) to store address translation entries for instructions. Here, a processor capable of speculative execution potentially prefetches and speculatively executes predicted branches.

Decode module 125 is coupled to fetch unit 120 to decode fetched elements. In one embodiment, processor 100 is associated with an Instruction Set Architecture (ISA), which defines/specifies instructions executable on processor 100. Here, often machine code instructions recognized by the ISA include a portion of the instruction referred to as an opcode, which references/specifies an instruction or operation to be performed.

In one example, allocator and renamer block 130 includes an allocator to reserve resources, such as register files to store instruction processing results. However, thread 101 is potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. In fact, instructions/operations are potentially scheduled on execution units according to their type availability. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states, such as modified, exclusive, shared, and invalid (MESI) states. The D-TLB is to store recent virtual/linear to physical address translations. Previously, a D-TLB entry includes a virtual address, a physical address, and other information, such as an offset, to provide inexpensive translations for recently used virtual memory addresses.

In FIG. 1, processor 100 is illustrated as a microprocessor with two logical processors, i.e. two hardware threads, where certain shared resources, such as a reservation unit and a pipeline, are capable of providing quality of service to two threads based on priority. However, processor 100 is not so limited. For example, processor 100 may be any processing element, such as an embedded processor, cell-processor, microprocessor, or other known processor, which includes any number of multiple cores/threads capable of executing multiple contexts, threads, virtual machines, etc.

Moreover, an oversimplified illustrative microarchitecture of an out-of-order of processor is illustrated for processor 100. However, any of the modules/units illustrated in processor 100 may be configured in a different order/manner, may be excluded, as well as may overlap one another including portions of components that reside in multiple modules. For example, a reservation unit may be distributed in processor 100 including multiple smaller reservation tables in different modules of processor 100.

Figure 2A:
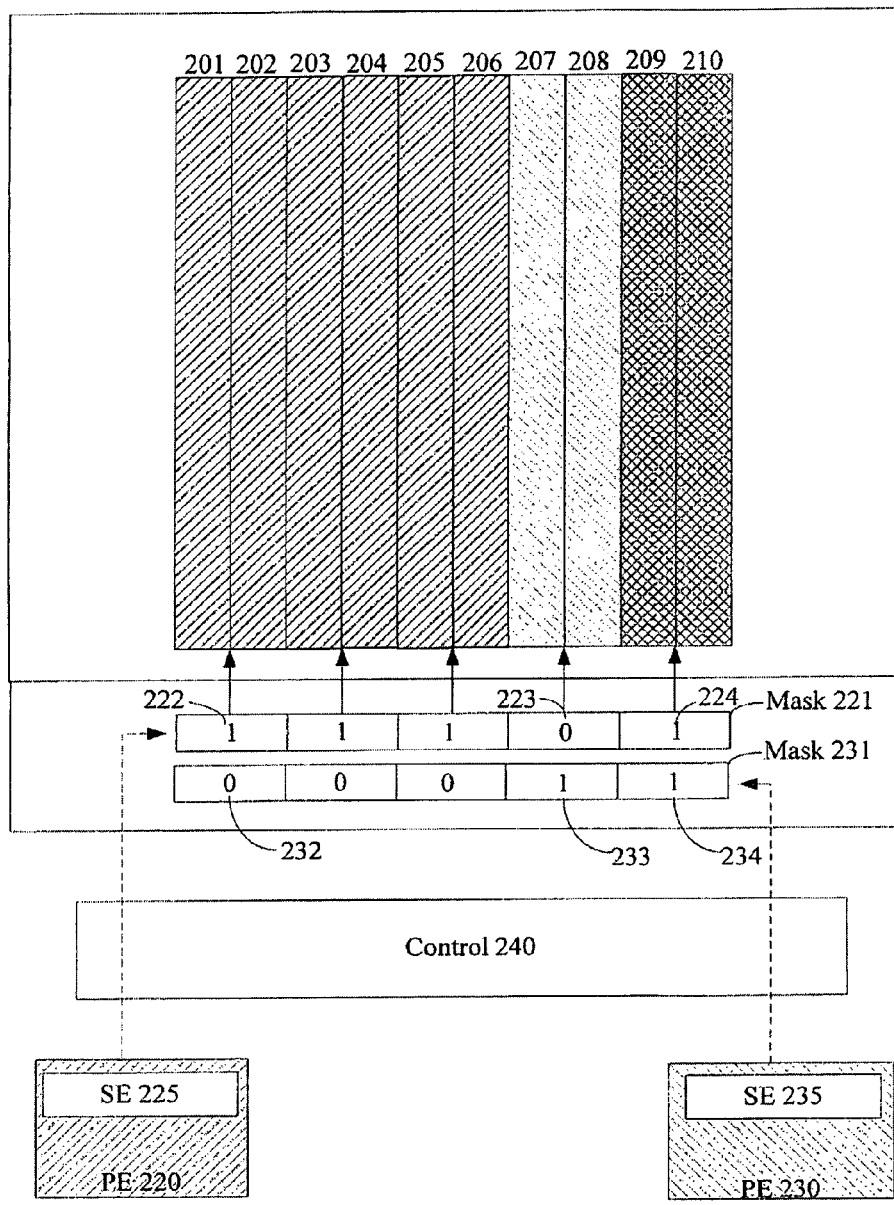
FIG. 2A illustrates an embodiment of a reservation unit capable of allocating entries to processing elements based on priority.

Turning to FIG. 2a, an embodiment of a reservation unit capable of providing quality of service to processing elements based on priority is illustrated. Here, reservation unit 200 includes reservation entries 201-210. As an example, reservation unit includes 36 entries; however, any number of entries may be included. An exemplary range of entries include a range of 8 entries to 128 entries.

In one embodiment, reservation entries are to hold instruction information. Note, in many architectures, instructions are broken down into multiple micro-operation (micro-ops). As a result, the use of instruction information also includes micro-op information. Examples of instruction information include reservation information, dependency information, instruction identification information, result information, scheduling information, and any other information associated with instructions or micro-operations, reservation of resources, and/or reservation entries.

For example, if a first entry referencing a first instruction is dependent upon a second instruction, the first entry includes dependency information to indicate it is dependent on the second instruction. As a result, the first instruction is not scheduled for execution until after the second instruction. Furthermore, the result from the second instruction may be held in the first entry, i.e. the entry associated with the first instruction that is dependent on the result of the second instruction.

Processing elements 220 and 230 share access to reservation unit 200. A storage area may be included to hold a first priority level associated with first processing element (PE) 220 and a second priority level associated with second processing element (PE) 230. The storage area may include any storage area in a processor, such as a cache, a register, or other storage device. In one embodiment, the storage area includes storage element 225 to hold a first priority level associated with processing element 220 and storage element 235 to hold a second priority level associated with processing element 230.

A storage element includes any element to store information, such as logical values to represent a priority level. Examples of a storage element include a context-specific configuration register, a context-specific control register, a machine state register (MSR), an architectural control register, an architectural status register, and a general control register.

The first and second priority level may include any priority level associated with a processing element or software entity. For example, there are two priority levels, i.e. a high priority and a low priority level. Certain types of software entities, such as media applications and operating system code, may be designated as high priority, and other software entities, such as virus scan software, may be designated as low priority. When two priority levels are utilized, a single bit in storage element 225 and 235 may be used to represent each of the priority levels. However, priority levels are not limited to two levels of priority. In fact, any number of priority levels or hierarchy of priority may be utilized. For example, four levels of priority represented by two bits may be utilized.

In one embodiment, a software entity, such as an operating system (OS), hypervisor, application, or section of code is to determine a priority level of a processing element. For example, a hypervisor or OS, which is aware of the software entities executing on PE 220 and 230, assign and write the first priority level to storage element 225 and the second priority level to storage element 235 based on the importance of each software entity in comparison to each other.

As another example, an OS or hypervisor swaps a priority level associated with a new context into storage element 225, in response to a context switch of the new context into PE 220. Here, storage element 225 is a thread specific control register, which is specific to PE 220. The OS or hypervisor writes to thread specific control register 225 when a new thread is swapped into core/hardware thread 220. Furthermore, an application to be executed on PE 220 may be given enough privilege level to set its own priority in PE 220.

In another embodiment, storage element 225 is an architectural control/status register or other control register that is automatically set in response to a context swap, instead of a software entity writing to register 225. Here, hardware or other code may determine a priority level of a context to be swapped into PE 220. When the context switch occurs, the contents of storage element 225 is automatically set.

Control module/logic 240 is to associate processing element 220 with a first portion of reservation resources, i.e. reservation unit 200, and processing element 230 with a second portion of the reservation resources. Based on the priority levels of processing elements 220 and 230, consumption of reservation unit 200 is altered to provide quality of service. Here, when a processing element, such as processing element 220, is higher priority than another processing element, such as processing element 230, more reservation entries are allocated to PE 220 in comparison to PE 230. As an example, when reservation unit 200 includes 36 entries, 20 entries are dedicated to PE 220, 8 entries are dedicated to PE 230, and 8 entries are shared between both PE 220 and 230.

Storage element 221 and 231 are illustrated outside control logic 240, but they may also be included within control logic 240. Additionally, control logic 240 may be distributed through out a processor including processing element 220 and 230. PE 220 is associated with storage element 221 and PE 230 is associated with storage element 231. In one embodiment, storage elements 221 and 231 are registers not visible to a hypervisor or operating system. In another embodiment, storage elements 221 and 231 are masking registers that are potentially visible to users as machine specific registers (MSRs); however, they may also be masking registers not visible at a user level and may only be visible to executives such as control logic 240, an operating system, hypervisor, or BIOS.

An entry or field in mask 221 is associated with a first number of reservation entries. As illustrated, field 222 is associated with two entries, i.e. entries 201 and 202. However, a field or any number of bits/fields may be associated with any number of reservation entries. As an example, a one to one relationship may exist between fields and entries or a one to two, three, four, eight, or other ratio may exist between fields and entries.

Here, when field 222 holds a first value, such as a logical one, entries 201 and 202 are associated with PE 220. In other words, when field 222 holds the first value, PE 220 may utilize entries 201 and 202 in reservation unit 200. Furthermore, when an entry, such as entry 223 holds a second value, such as a logical zero, PE 220 is not associated with corresponding entries 207 and 208. As a result, PE 220 is not able to utilize entries 207 and 208. Storage element 231 is associated with PE 230. Similar to field 222, field 232 in storage element 231 is also associated with entries 201 and 202. However, as illustrated, field 232 holds a second value, i.e. a logical zero, to indicate that PE 230 is not associated with entries 201 and 202. In other words, entries 201 and 202 are dedicated to PE 220, as field 222 indicates PE 220 may access entries 201 and 202, while entry 232 indicates that PE 230 may not access entries 201 and 202.

As illustrated, the combination of mask 221 and 231 indicates that entries 201-206 are dedicated to PE 220, entries 207-208 are dedicated to PE 230, and entries 209-210 are associated with both PE 220 and PE 230. Therefore, as illustrated, PE 220 is associated with a higher priority level than PE 230, which is indicated in storage elements 225 and 235. Here, quality of service is provided to processing element 220, i.e. the higher priority processing element, by allowing PE 220 to access 8 of the 10 reservation entries, while lower priority PE 230 is only able to access 4 of the 10 entries. Furthermore, PE 220 has 6 dedicated entries, and PE 230 only has 2 dedicated entries.

Note that mask 221 and 231 may be dynamically updated at anytime. For example, upon spawning a new thread entries may be dynamically dedicated to the new thread. Inversely, when killing a thread, dedicated entries may be de-allocated from that thread and returned to the common use pool, which currently includes entry 209-210, or dedicated to another processing element. Furthermore, entries may be reserved for debugging or other purposes from both processing elements. Although not shown, if entry 224 and 234 both included logical zeros, then both thread 220 and thread 230 are not associated with entries 209-210.

In addition, upon swapping in a context to a processing element, such as PE 220, control logic 240 may re-evaluate the priorities and change masks 221 and 231 accordingly. In one embodiment, where PE 220 represents a lower priority than PE 230, mask 221 and 231 are updated to provide more reservation entries to PE 230. In another embodiment, mask 231, i.e. the higher priority mask, may be updated to provide more entries to PE 230 from the shared entry pool of entries 209-210. Furthermore, mask 221 may be updated to return some dedicated entries, i.e. 201-206, to the shared entry pool.

Figure 2B:
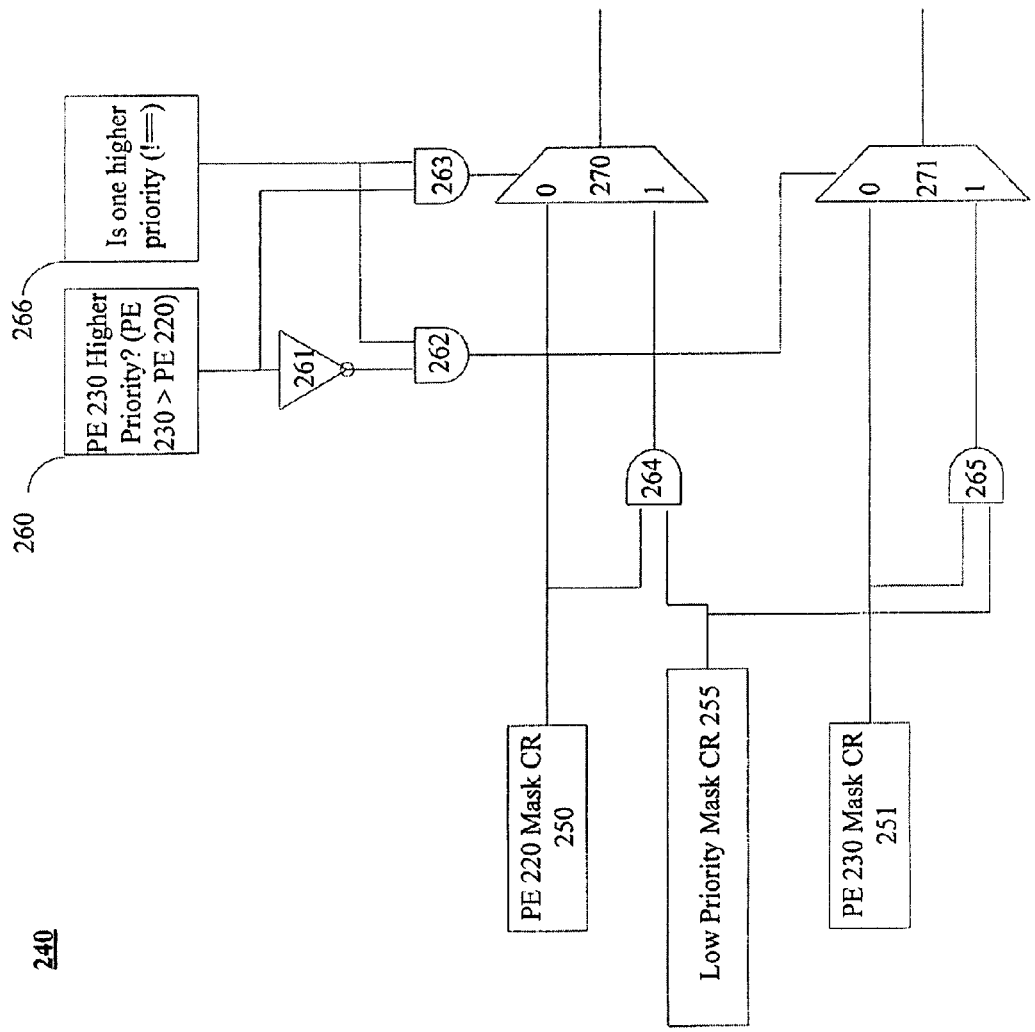
FIG. 2B illustrates an embodiment of logic to allocate reservation entries to processing elements based on a comparison of priority level.

Referring quickly to FIG. 2b, an embodiment of control module/logic 240 is illustrated. Although, both mask 221 and 231 may be updated to provide quality of service to a higher priority PE, as illustrated, a lower priority mask is utilized to ensure quality of service for a high priority processing element. In other words, as illustrated in FIG. 2, instead of adding access to entries by a high priority processing element through updating a high priority mask, entries are de-allocated or taken away from the low priority processing element through updating a low priority mask.

As an example, assume that storage element 225 from FIG. 2a indicates that PE 220 is lower priority than PE 230, which is indicated in storage element 235. However, initially mask 221 and 231 are set to the values illustrated in FIG. 2a, which provides PE 220 with more entries than PE 230. Control logic 240 in FIG. 2b determines that PE 230 is higher priority and imposes a low priority mask for PE 220 to ensure higher priority PE 230 receives adequate quality of service from the reservation station. Essentially, multiplexers 270 and 271 are to drive final masks based on priority of PEs 220 and 230. In the example shown, multiplexer 270 selects mask 250, if PE 220 is higher priority, and selects the alternative ANDed value if PE 220 is lower priority. In one embodiment, outputs of multiplexer 270 and 271 are to drive masks 221 and 231 of FIG. 2a. In another embodiment, the output of multiplexer 270 and 271 are provided back to masks 250 and 251, which effectively operate as final masks 221 and 231 to determine reservation entry allocation.

To walkthrough an illustrative example, logic 260 determines if PE 230 is higher priority than PE 220. In one embodiment, comparison logic compares the priority level stored in storage element 235 with the priority level stored in storage element 225. Here, processing element 230 is higher priority, i.e. the statement in logic 260 is true and the statement of logic 266 is true. As a result, a logical one is sent to inverter 261/AND gate 263 from logic 260, as well as to AND gate 262 and AND gate 263 from logic 266. The inverted output of inverter 261, i.e. a logical zero, and the logical one from logic 266 is taken as an input to AND gate 262. Logical ones from 260 and 266 are taken as inputs to AND gate 263. AND gate 262 outputs a zero to multiplexer 271, selecting the original mask value from control register 251 for PE 230. In other words, the default mask value is utilized for the high priority processing element.

In contrast, the output from AND gate 263 provides a logical one to multiplexer 270, which selects the output of AND gate 264, i.e. the result of performing an AND operation between low priority mask 255 and mask control register 250 for PE 220. In other words, a low priority mask is imposed on mask control register 250. Here, entries are de-allocated from a lower priority processing element, such s PE 220, by imposing a low priority mask. Also note, that when PE 220 is higher priority, the lower priority mask 255 is imposed on control register 251 for processing element 230. The example illustrated in FIG. 2b, only illustrates two processing elements. Yet, similar logic may be used to update any number of masks for any number of processing elements. Furthermore, entries may be added to a high priority PE through a high priority mask, i.e. ORing in logical ones, taken away from a low priority PE through a low priority mask, redistributed through operating on both masks, or a combination thereof.

Returning to FIG. 2a, in another embodiment not shown, storage elements 221 and 231 include counters that hold a number of entries currently usable by PEs 220 and 230, respectively. When allocating new instructions or micro-operations into reservation unit 200, a PE is allocated entries when a current number of entries in use are below a threshold value. Upon allocating entries, the counters are incremented, and upon de-allocating the entries, the counters are decremented. As a result, the threshold may be set higher for higher priority processing elements and/or lower for lower processing elements.

Above, examples utilized a logical one and a logical zero as first and second values, respectively. However, any values may be held in fields to indicate an associated resource is or is not associated with reservation entries. Furthermore, there may be any number of storage elements associated with any number of processing elements, which are illustrated as threads, but may include any resource that shares access to reservation unit 200.

Figure 3A:
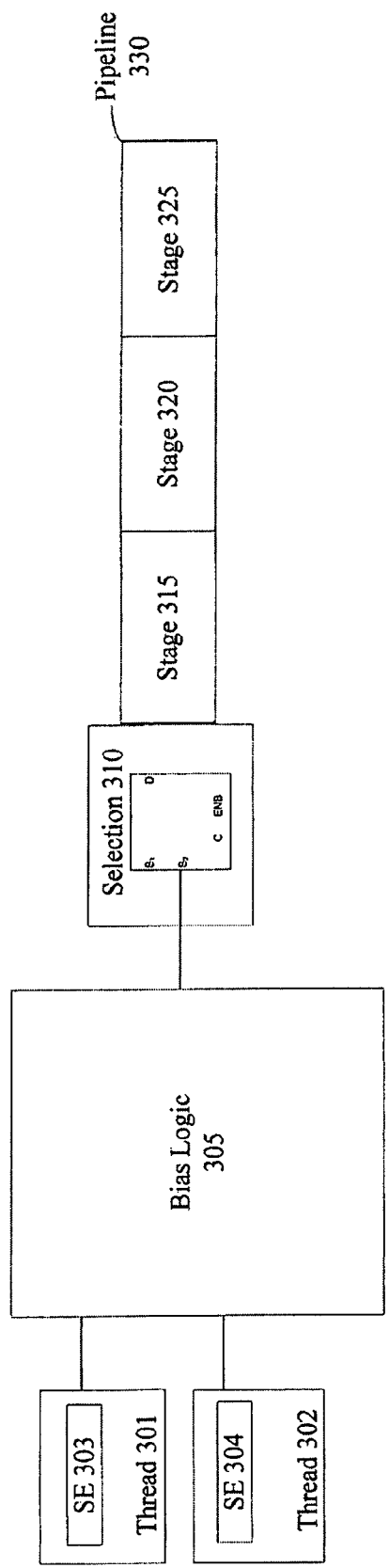
FIG. 3A illustrates an embodiment pipeline including bias logic to bias consumption of the pipeline towards a higher priority processing element.

Turning to FIG. 3a, an embodiment of a pipeline capable of providing quality of service to threads based on priority is illustrated. Although threads are illustrated, any processing element to share a pipeline may be included. A pipeline often refers to a number of elements or stages coupled together in series, wherein the output of one stage is the input of a next stage. For example, an oversimplified pipeline includes four stages: fetch, decode, out of order execution, and retire. Note that pipeline 330 includes any number of stages. In addition, pipeline 330 may represent a portion of a pipeline, such as a front-end portion, back-end portion, or other portion, as well as an entire pipeline. Stages 310-325 include any known pipeline stages, such as resource selection, instruction decode, allocation, rename, execution, retire, or other pipeline stage.

Selection stage 310, as illustrated, is to select either thread 301 or thread 302 for further processing in pipeline 330. Previously, selection stage 310 would select an inverse of the last thread selected, so that thread 301 and 302 would be selected every other cycle, assuming no stalls or other events occurred in the pipeline.

In one embodiment, bias logic 305 is to bias selection logic toward a higher priority thread. As an example, storage element 303 holds a first priority level for thread 301 and storage element 304 holds a second lower priority level for thread 302. As a result, bias logic 305 biases selection logic towards thread 301, or in other words, away from thread 302. In one embodiment, bias logic 305 provides a ratio of thread preference to selection logic 310 over time to bias selection logic 310 towards thread 301. Here, biasing towards thread 301 includes providing more preference for thread 301 than thread 302 to selection logic 310. For example, a ratio of 6:2 for preferring thread 301 over thread 302 is provided to selection logic 310. Other examples of ratios include 3:1, 4:1, 5:2, and 8:0. Although, specific examples of ratios are proffered, any ratio or pattern of preference may be provided to selection logic 310. Additionally, different preference levels may be provided when more than two threads share access to pipeline 330. Here, biasing to a higher preference thread includes more preference values for that thread than a lower priority thread.

Figure 3B:
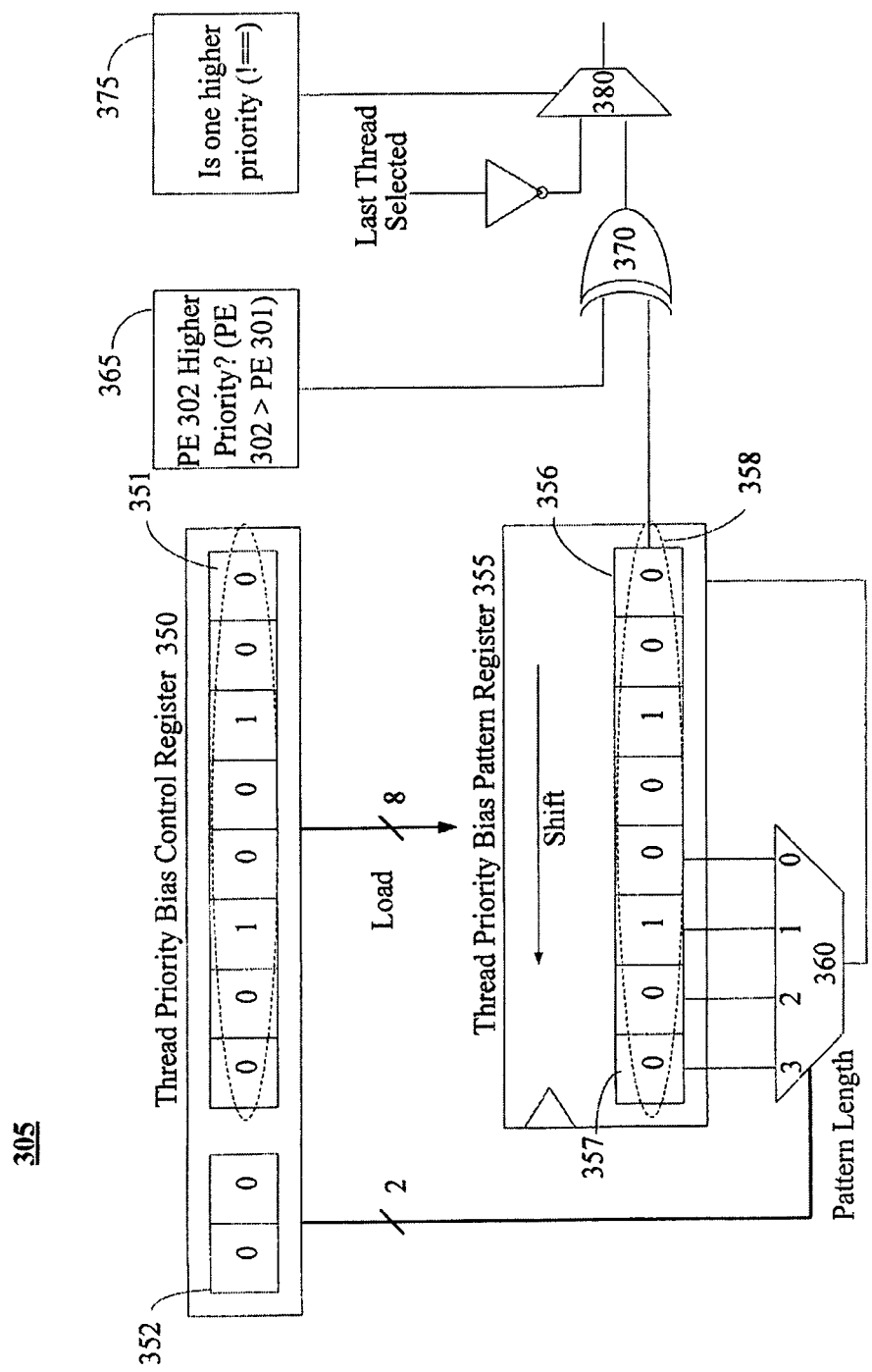
FIG. 3B illustrates an embodiment of bias logic to bias consumption of the pipeline towards a higher priority processing element.

Turning to FIG. 3b an embodiment of bias logic 305 is illustrated. Here, thread priority bias pattern register 355 is a configurable length feedback register to inject a pattern of thread preference over time. For example, a logical zero from bias pattern register 355 represents a preference for a first thread, such as thread 301, and a logical one represents a preference for a second thread, such as thread 302. Bias pattern 358, as illustrated, is to bias a preference towards thread 301.

In one embodiment, control register 350 is to hold bias pattern 351. As an example, upon a reset or boot, bias control register 350 is set to hold a bias pattern. Additionally, bias control register 350 may be set during runtime by a software entity, user, or other hardware/software to provide dynamic alteration of a bias pattern/ratio. As illustrated, one portion of bias control register 350 is to hold bias pattern 351, and a second portion is to hold size value 352. In one embodiment, bias pattern register 355 has an adjustable size. Here, based on size value 352, multiplexer 360 selects one of four inputs from shift register 355 to be a head entry. For example, a value of 00 in size value 352 selects the zero input of multiplexer 360 as the head entry, which effectively sets the size of register 355 to five. As another example, size value 352 is set to 11 to select input three of multiplexer 360, i.e. head entry 357, as the head entry, which effectively sets the size of register 355 to eight.

By adjusting the size of register 355, different ratio's of preference may be provided. For example, with a size of eight, a ratio of 3:2 may not be provided; however, if the size is set to five, i.e. a size value of 00, a ratio of 3:2 may be provided. In one embodiment, a selected head entry value, such as head entry 357, is recycled to tail entry 356. Here, when the zero in entry 357 is shifted out as a preference, it is also recycled to tail 356, while the other values are shifted forward in shift register 355. Although the above discussion referenced an eight bit shift register, any size storage area with any preference ratio may be utilized. Furthermore, any values may be used to represent processing elements or threads. For example, combination of binary values or multiple registers may be used for more than two threads/processing elements.

In one embodiment, register 355 does not shift out a value from head entry 357 during an empty/idle cycle. For example, when a blocking stall occurs in a pipeline, selection of a thread may not occur, because further processing is not able to proceed. Another example of an empty cycle includes a cycle where no micro-operations, operations, or instructions are available for further processing. As stated, above a preference includes representing a preference for selection of one thread over another thread. As illustrated, a ratio of 6:2 is provided, where one thread is to be preferred for selection six times in comparison to two times of another thread. Therefore, shifting a value from register 355 during an empty cycle potentially alters a predetermined preference ratio.

To illustrate, assume the two zeros from the left of register 355 are shifted out during idle cycles, where no selection is made, and then all the rest of the remaining register values are shifted out to provide preference during active cycles. As a result, the first thread, which is represented by a logical zero, would be selected four times instead of the predetermined six times. Consequently, the current ratio of 6:2 would be altered to 4:2 by shifting in an idle cycle. Here, a value is not shifted out in response to an empty or idle cycle to potentially preserve the ratio. Note, as discussed later, selection logic may ignore a preference, due to inactivity of a single preferred thread. Therefore, in another embodiment, a value may not be shifted out due to inactivity of a single processing element.

Logic 365 and/or logic 375 are to determine priority levels of processing elements. When there are more than two processing elements, more complex comparison logic may be utilized to determine multiple priority levels. Here, logic 365 is to determine if a processing element, such as thread 301, is higher priority than another processing element, such as thread 302. For example, logic 365 compares a priority value held in storage element 303 associated with thread 301 with a priority level held in storage element 304 associated with thread 302.

Note that logic 375, which is to determine if there is a higher priority processing element, is illustrated as separate from logic 365; however, logic 365 may determine both if one PE is higher priority and/or the same priority. Here, logic 365 is to output a logical zero if thread 301 is a higher priority than thread 302 and a logical one if thread 302 is higher priority than thread 301. As illustrated, logic 370 is an XOR gate. Therefore, if logic 365 outputs a logical zero to indicate that thread 301 is higher priority, then the preference value from register 355 is maintained. However, if thread 302 is higher priority, as indicated by a logical one from logic 365, then the preference value is inverted.

Essentially, the bias pattern is a universal bias pattern, initially setup from the perspective of thread 301, which is inverted in response to determining thread 302 is a higher priority. For example, as shown a preference of 6:2 for thread 301 is provided in register 355 as a bias pattern. However, if logic 365 outputs a logical one to indicate thread 302 is higher priority, then XOR 370 provides an inverted bias pattern, which now has a 6:2 preference for thread 302.

In another embodiment, XOR 370 is coupled between control register 350 and priority bias pattern register 355. Here, the bias pattern may be reloaded upon a change of thread priority. In the case where thread 302 becomes the higher priority thread, initial bias pattern 355 is inverted through the XOR gate upon loading into bias pattern register 355 to form an inverted bias pattern.

As stated above, logic 375 is to determine if one thread is higher priority than the other thread. Here, if thread 301 and thread 302 are the same priority level, then a logical value is output to multiplexer 380, which indicates the threads are the same priority level. As a result, multiplexer 380 selects a default input, i.e. the default selection logic's inversion of the last thread selected. Here, as discussed above, an inversion of the last thread is selected. However, if one of the threads is a higher priority, then a second logical value is provided to multiplexer 380 to select the preference value provided from logic 370. In other words, when there is a priority difference the preference is selected and when there is no priority difference a default selection method is utilized.

As discussed above, logic, which is not illustrated, may be provided to ignore a preference and select another thread during an idle cycle of a single thread. For example, a logical zero is shifted out from head entry 357. Logic 365 determines that thread 301 is higher priority than thread 302. As a result, XOR 370 outputs a logical zero to multiplexer 380. Furthermore, as thread 301 is higher priority than thread 302, logic 375 provides a logical value to select the preference value of zero, i.e. thread 301. However, assuming thread 301 has an idle cycle, i.e. no micro-operations or operations to be selected, selection logic may select thread 302 to maintain maximum usage of a pipeline.

Returning to FIG. 3a, in another embodiment not illustrated, bias logic 305 includes tracking logic to track selection of thread 301 in relation to selection of thread 302. In one embodiment, tracking logic includes a counter or a group of counters. Here, when thread 301 is selected the counter is incremented, and when thread 302 is selected the counter is decremented. As a result, if thread 301 is selected more times than thread 302 the counter has a positive value. Inversely, the counter may increment for selection of thread 302. Control logic may also be included and coupled to the tracking logic, to provide a preference based on the value of the counter. For example, if thread 301 is a higher priority, then control logic provides a preference based on the counter value. In this case, the control logic attempts to maintain a positive counter value, i.e. more selections of thread 301 in relation to thread 302. Alternatively, the counter is attempted to be maintained at zero. Here, upon selection of thread 301 the counter is decremented by three and upon selection of thread 302 the counter is incremented by one. Biasing selection to maintain the counter at zero, in this example, provides a 3:1 ratio of selection towards thread 301.

Figure 4:
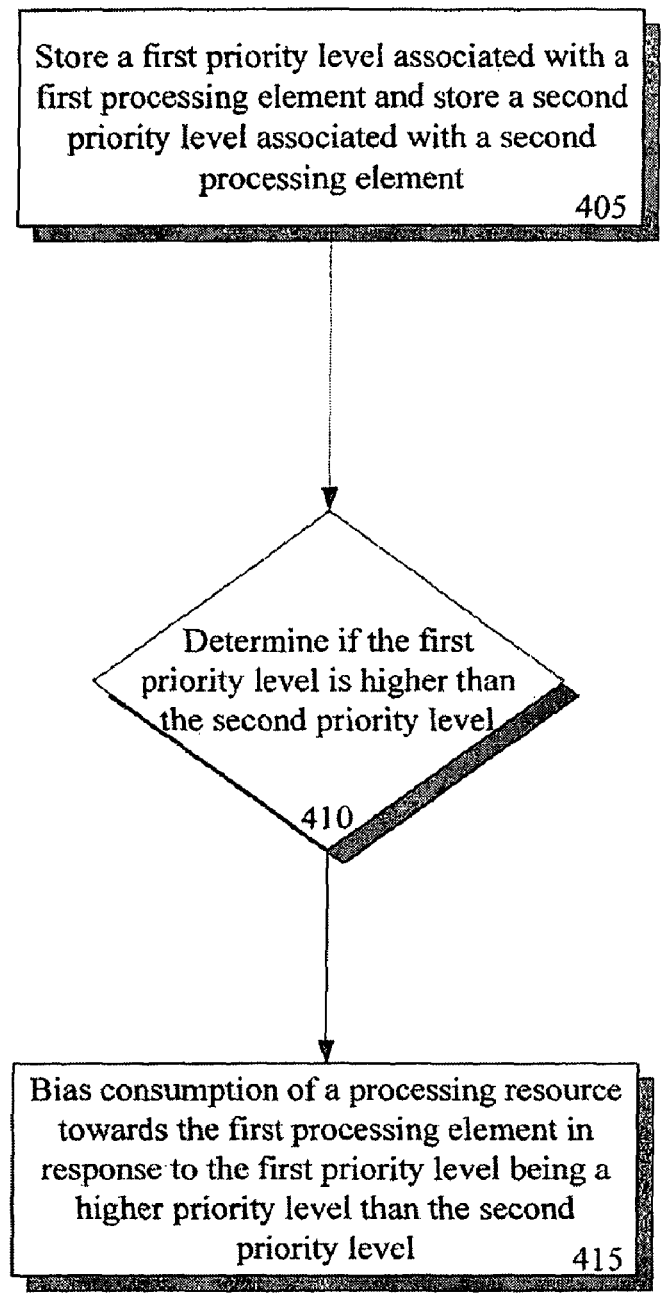
FIG. 4 illustrates an embodiment of a flow diagram for a method of biasing consumption of a processing resource towards a processing element based on priority.

In reference to FIG. 4, an embodiment of a flow diagram for a method of biasing consumption of a resource based on priority is illustrated. In flow 405 a first priority level associated with a first processing element and a second priority level associated with a second processing element is stored in a storage area. A processing element often includes any element to hold a processor context/state, such as a thread, core, or other known processor device. Examples of the storage area include a cache, a memory, register, a machine specific register (MSR), a control register, a context specific register, an architectural register, or other storage element. The storage area may be a physically contiguous storage area or separate storage elements.

Priority may be determined in any manner. In one embodiment, a software entity, such as a hypervisor, operating system, guest application, application, virtual machine, or other code determines a priority level of a task and/or code to be executed on a processing element. In another embodiment, hardware and/or firmware determines priority levels of processing elements based on any number of factors, such as tasks to be executed, power consumption levels, and/or user requests. In yet another embodiment, a user is able to access the storage area to specifically set priority levels. As an illustrative example, with a thread, in response to a context switch, a priority level is swapped into a context specific register to indicate priority level.

Next, in flow 410 it is determined if the first priority level, which is associated with the first processing element, is a higher priority level than the second priority level, which is associated with the second processing element. In one embodiment, comparison logic is utilized to compare a first priority value to a second priority value. In another embodiment, code, when executed, is to compare the first priority level and the second priority level. If the first priority level is the same as the second priority level, a default selection method, such as alternating selection, is utilized.

However, if the first priority level is higher priority than the second priority level, then in flow 415, consumption of a processing resource is biased towards the first processing element. Examples of a processing resources include reservation resources, a reservation station, a pipeline, a fill buffer, a branch predictor unit, a translation buffer, a cache. In one embodiment, where the resource is a reservation station, biasing consumption of the reservation station towards a first processing element includes setting a first and a second mask, accordingly.

As discussed above in reference to FIG. 2, either more total entries or more dedicated entries are associated with the first processing element in relation to a second lower priority processing element. As a specific illustrative example, with a 28 entry reservation station, the first mask is set to a first value to indicate 24 entries are associated with the first processing element and the second mask is set to a second value to indicate 12 entries are associated with the second processing element. In addition, the combination of the values indicates that 16 entries are dedicated to the first processing element, 4 entries are dedicated to the second processing element, and 8 entries are shared among the first and the second processing elements.

Figure 5:
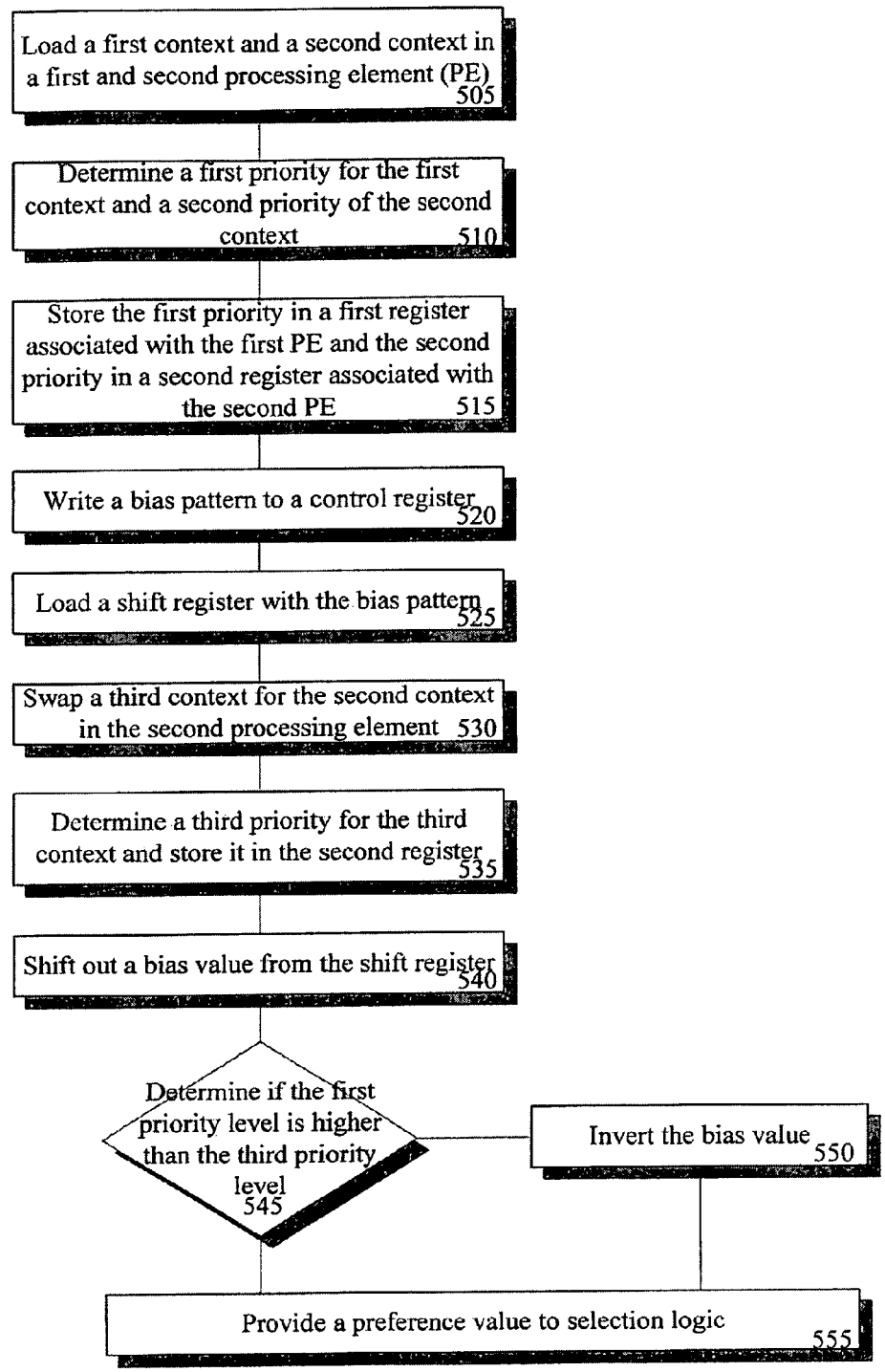
FIG. 5 illustrates an embodiment of a flow diagram for a method of biasing consumption of a shared pipeline towards a processing element based on priority.

Turning to FIG. 5, an embodiment of a flow diagram for a method of biasing consumption of a pipeline based on priority is illustrated. Although, the flows in FIGS. 4 and 5 are illustrated in a linear fashion, different flows may be performed in different orders. For example, bias pattern flows 520 and 525 may be performed upon boot of a computer system before flow 505 or later. In flow 505, a first context and a second context are loaded in a first and second processing element. As an example, a first context is loaded in a first thread and a second context is loaded in a second thread. Often loading a context includes loading an architecture state of a thread in architecture state registers, as well as loading of other context related information.

Next, in flow 510, a first priority for the first processing element and a second priority for the second processing element is determined. In one embodiment, the priority level may have been predetermined by previous execution of the context. Alternatively, hardware, software, and/or firmware may determine a priority level for a context based on any number of factors. The determined priority levels are stored in a first register associated with the first processing element and a second register associated with the second processing element, accordingly in flow 515.

In flows 520 and 525, a bias pattern value is written to a control register and loaded from the control register to a shift register. In one embodiment, the bias pattern is a universal ratio preference pattern. Here, the default pattern as propagated to selection logic may represent a preference for a first thread over a second thread. However, logic during the propagation of the preference may invert the preference in response to the second thread being a higher priority. Alternatively, logic may be coupled between the control register and shift register to invert the universal bias pattern in response to the second thread being a higher priority level.

Note, here the flow may move to flow 540, where a value is shifted out and a preference or inverted preference value is provided in response to a priority difference between the first and second contexts. However, to further illustrate potential operation, in flow 530 a third context is swapped into the second processing element. Context switching may occur for any number of reasons, such as upon encountering a trigger event/operation or management of inactive/active threads.

In flow 535 a third priority for the third context is determined. Additionally, the third priority is stored in the second register associated with the second processing element. In one embodiment, during a context switch, a software entity, such as an operating system or hypervisor, swaps the third priority level into the second register, which is a context specific register associated with the second processing element. In another embodiment, the second register is an architectural register that is swapped automatically with the new third priority level in response to a context switch.

In flow 540, a bias value is shifted out from the shift register that is to hold the bias pattern. As stated above, the bias pattern may include any ratio of preference. In flow 545 it is determined if the first priority level is a higher priority level than the third priority level. If the first priority level is higher than the third priority level, then the bias value is provided to selection logic without inversion. However, if the third priority level is higher, then in flow 550 the bias value is inverted. Essentially if the shifted out bias value represented the first thread it is inverted to represent the second thread, and vice-versa. The selection logic potentially selects a thread for further processing based on a preference value, i.e. the bias value or the inverted bias value. Note that the selection logic may select a thread different from the preference value. For example, if the preference value represents the first thread, and the first thread has an idle cycle, the selection logic may select the second thread to maintain a full pipeline.

As illustrated above, quality of service is provided from resources, such as reservation stations and pipelines, for processing elements based on priority. As a result, high priority application, such as media application, may be given an unfair or larger amount of a resource to ensure higher performance. However, when processing elements have the same priority level default selection methods may be utilized or default amounts of a resource may be made available to ensure fair access.

The embodiments of methods, software, firmware or code set forth above may be implemented via instructions or code stored on a machine-accessible or machine readable medium which are executable by a processing element. A machine-accessible/readable medium includes any mechanism that provides (i.e., stores and/or transmits) information in a form readable by a machine, such as a computer or electronic system. For example, a machine-accessible medium includes random-access memory (RAM), such as static RAM (SRAM) or dynamic RAM (DRAM); ROM; magnetic or optical storage medium; flash memory devices; electrical, optical, acoustical or other form of propagated signals (e.g., carrier waves, infrared signals, digital signals); etc.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:

a first processing element;

a second processing element;

a storage area adapted to hold a first priority level associated with the first processing element and a second priority level associated with the second processing element; and reservation resources adapted to include a reservation station having a plurality of reservation entries, and wherein the first portion of reservation resources is to include a first number of reservation entries of the plurality of reservation entries and the second portion of reservation resources is to include a second number of reservation entries of the plurality of reservation entries, the first number of reservation entries and the second number of reservation entries to overlap to form a shared number of reservation entries;

a first mask element associated with the first processing element to hold a plurality of first mask entries, wherein a first number of the plurality of first mask entries are to hold a first value to associate the first processing element with the first number of entries and a second number of the plurality of first mask entries are to hold a second value to de-associate the first processing element with the second number of reservation entries of the plurality of reservation entries; and a second mask element associated with the second processing element to hold a plurality of second mask entries, wherein a first number of the plurality of second mask entries are to hold the first value to associate the second processing element with the second number of entries and a secondnumber of the plurality of second mask entries are to hold the second value to de-associate the second processing element with the first number of reservation entries of the plurality of reservation entries.

2. The apparatus of claim 1, wherein the first and the second processing elements are each selected from a group consisting of a microprocessor, an embedded processor, a core, a thread, and a cell processor.

3. The apparatus of claim 1, wherein the storage area includes a first storage element to hold the first priority level and a second storage element to hold the second priority level.

4. The apparatus of claim 3, wherein the first storage element and the second storage element include registers, each selected from a group consisting of a context-specific configuration register, a context-specific control register, a machine state register (MSR), an architectural control register, an architectural status register, and a general control register, and wherein the first and the second storage element are capable of being accessed by a software entity selected from a group consisting of a hypervisor, an operating system, and an application.

5. An apparatus comprising: processor including a pipeline shared by at least a first and a second processing element, wherein the processor also includes:
   a storage area to hold a first priority level associated with the first processing element and a second priority level associated with the second processing element;
   selection logic to select the first processing element or the second processing element for further processing in the pipeline; and
   bias logic to bias the selection logic toward the first processing element in response to the first priority level being higher priority than the second priority level, wherein the bias logic includes,
      a bias pattern shift register to hold a bias pattern, the bias pattern to represent a preference towards the first processing element,
      a first group of logic to determine if the first priority level is higher priority than the second priority level, and
      a second group of logic to output a preference value to the selection logic, wherein the preference value includes a first preference value from the bias pattern in response to the first priority level being higher than the second priority level and a second inverted preference value from the bias pattern in response to the second priority level being higher priority than the first priority level.

6. The apparatus of claim 5, wherein the first and the second processing element are each selected from a group consisting of a microprocessor, an embedded processor, a core, a thread, and a cell processor, and wherein the storage area includes a first storage element to hold the first priority level and a second storage element to hold the second priority level.

7. The apparatus of claim 5, wherein the bias pattern to represent a preference towards the first processing element comprises the bias pattern including more of a first value representing a preference for the first processing element than a second value representing a preference for the second processing element.

8. The apparatus of claim 5, wherein the selection logic is capable of selecting the second processing element in response to the preference value representing the first processing element during an idle cycle of the first processing element.

9. The apparatus of claim 5, wherein the bias pattern shift register recycles values shifted from a head entry of the bias pattern shift register to a tail entry of the bias pattern shift register, and wherein in response to the first and the second processing elements being idle no value is shifted out from the head entry of the bias pattern shift register.

10. The apparatus of claim 9, wherein the bias logic further includes a control register to hold a size value to set a size of the bias pattern shift register and to hold the bias pattern to be loaded in the bias pattern shift register, and wherein the size value to be held in the control register is to be used as an input in a multiplexer to select an entry of the bias pattern as the head entry.

11. The apparatus of claim 5, wherein the bias logic includes:
   tracking logic to track a number of times the selection logic selects the first processing element in relation to the second processing element; and
   control logic to provide a first preference representing the first processing element to the selection logic based on the number of times the selection logic selects the first processing element in relation to the second processing element in response to the first priority being higher than the second priority and to provide a second preference representing the second processing element to the selection logic based on the number of times the selection logic selects the first processing element in relation to the second processing element in response to the second priority being higher than the first priority.

12. A method comprising:
   storing a first priority level associated with a first processing element of a processor in a first storage element and a second priority level associated with a second processing element of the processor in a second storage element;
   determining if the first priority level is a higher priority level than the second priority level;
   biasing consumption of a pipeline shared by the first and the second processing resource towards the first processing element in response to the first priority level being a higher priority level than the second priority level, wherein biasing consumption of the pipeline towards the first processing element includes:
      loading a bias pattern in a bias shift register;
      shifting a first bias value representing the first processing element from the bias pattern in the bias shifter register;
      selecting the first processing element for further processing in the pipeline based on the first bias value in response to the first processing element having activity to be scheduled in the pipeline during a current cycle.

13. The method of claim 12, wherein storing the first priority level associated with a first processing element of a processor in a first storage element is in response to swapping in a first context associated with the first processing element, the first priority level being based on the first context, and wherein storing the second priority level associated with a second processing element of a processor in a second storage element is in response to swapping in a second context associated with the second processing element, the second priority level being based on the second context.

14. The method of claim 12, wherein loading a bias pattern in a bias shift register includes:
   storing the bias pattern in a bias pattern control register to set a ratio of consumption of the processing resource towards the first processing element; and
   loading the bias pattern into the bias shift register from the bias pattern control register.

15. The method of claim 14, wherein the ratio of consumption of the processing resource towards the first processing element includes a three to one ratio for the first processing element to the second processing element, respectively.

16. The method of claim 12, further comprising biasing consumption of the pipeline towards the second processing element in response to the second priority level being a higher priority level than the first priority level, wherein biasing consumption of the pipeline towards the second processing element includes:
   inverting the first bias value representing the first processing element from the bias pattern in the shift register to an inverted first bias value representing the second processing element, in response to the second priority level being a higher priority level than the first priority level; and
   selecting the second processing element for further processing in the pipeline based on the inverted first bias value in response to the second processing element having activity to be selected during a current cycle.

17. The method of claim 12, wherein biasing consumption of the pipeline towards the first processing element also includes: not shifting the first bias value from the bias pattern in the bias shift register in response to an empty cycle.

18. The method of claim 12, wherein biasing consumption of the pipeline towards the first processing element also includes: selecting the second processing element in response to the first processing element not having activity to be scheduled in the pipeline during the current cycle.

* * * * *